United States Patent
Iwasaki (10) Patent No.: US 9,032,040 B2
(45) Date of Patent: May 12, 2015

(54) RECEIVING DEVICE AND METHOD

(75) Inventor: Shingo Iwasaki, Fujisawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 640 days.

(21) Appl. No.: 12/797,403

(22) Filed: Jun. 9, 2010

(65) Prior Publication Data
US 2010/0250696 A1    Sep. 30, 2010

Related U.S. Application Data (63) Continuation of application No. PCT/JP2009/003199, filed on Jul. 9, 2009.

(30) Foreign Application Priority Data

Jul. 31, 2008    (JP) .................................. 2008-198624

(51) Int. Cl.
| | | |
|---|---|---|
| G06F 15/16 | (2006.01) |
| H04Q 5/22 | (2006.01) |
| H04L 9/00 | (2006.01) |
| H04L 12/801 | (2013.01) |
| H04L 12/851 | (2013.01) |
| H04L 12/58 | (2006.01) |
| H04L 29/06 | (2006.01) |
| H04N 13/00 | (2006.01) |
| G11B 20/10 | (2006.01) |

(52) U.S. Cl.
CPC ............ H04L 47/19 (2013.01); *H04N 13/0066* (2013.01); *G11B 2020/10611* (2013.01); H04L 47/24 (2013.01); H04L 51/26 (2013.01); H04L 69/22 (2013.01)

(58) Field of Classification Search
CPC .................... H04N 13/0066; G11B 11/10595; G11B 19/02; G11B 19/26; G11B 2020/10611; G11B 2020/10944; G11B 2020/1238; H01L 27/115; G06F 12/00; H04L 7/02
USPC .......................................................... 709/207
See application file for complete search history.

(56) References Cited

U.S. PATENT DOCUMENTS

| | | | | |
|---|---|---|---|---|
| 5,140,584 | A | * | 8/1992 | Suzuki ........................ 370/235 |
| 6,195,534 | B1 | * | 2/2001 | Sakoda et al. ................. 455/45 |
| 6,738,371 | B1 | * | 5/2004 | Ayres ........................... 370/352 |
| 2003/0128708 | A1 | * | 7/2003 | Inoue et al. .............. 370/395.42 |

(Continued)

FOREIGN PATENT DOCUMENTS

| | | |
|---|---|---|
| JP | 4-270535 | 9/1992 |
| JP | 11 341057 | * 9/1992 |

(Continued)

OTHER PUBLICATIONS

Japanese Office Action dated Nov. 30, 2012 issued during prosecution of related Japanese Application No. 2008-198624.

*Primary Examiner* — Krista Zele
*Assistant Examiner* — Margishi Desai
(74) *Attorney, Agent, or Firm* — Fitzpatrick, Cella, Harper & Scinto (57) ABSTRACT

A receiving device receives messages, detects the priority levels set in the headers of the messages, and reads the first and second messages. When the receiving device receives the header of the second message during reading of the first message, it controls, in accordance with the priority levels of the first and second messages, the reading rates at which the first and second messages are read.

19 Claims, 6 Drawing Sheets

(56) References Cited

U.S. PATENT DOCUMENTS

2007/0282857 A1    12/2007  Iwasaki
2009/0237422 A1*    9/2009  Modi et al. .................... 345/685
2009/0282150 A1    11/2009  Iwasaki
2010/0097979 A1*    4/2010  Shinozaki .................... 370/315

FOREIGN PATENT DOCUMENTS

| JP | 11-341057 | 12/1999 |
| JP | 04270535 | * 12/1999 |
| JP | 2003-58382 | 2/2003 |

* cited by examiner

| | |
|---|---|
| RATE AT WHICH MESSAGE IS READ FROM STREAM | 1000 [byte/s] |
| BUFFER SIZE AT WHICH MESSAGE IS READ AT ONCE FROM STREAM | 1000 [byte] |

402

| MESSAGE | TOTAL SIZE | RECEIVED SIZE | PRIORITY |
|---|---|---|---|
| FIRST RECEPTION MESSAGE | 20000 [byte] | 10000 [byte] | 1 |
| SECOND RECEPTION MESSAGE | 40000 [byte] | 0 [byte] | 10 |

RECEIVING DEVICE AND METHOD

This application is a continuation application of Application No. PCT/JP2009/003199, filed on Jul. 9, 2009, which claims priority from Japanese Patent Application No. 2008-198624, filed on Jul. 31, 2008, the entire contents of each of which are incorporated by reference herein.

TECHNICAL FIELD

The present invention relates to a receiving device and method.

BACKGROUND ART

In recent years, various services are offered through a computer network, and Web service techniques are being used. The Web service is a mechanism to dynamically exchange data between computers using a variety of communication protocols typified by HTTP without human intervention. In the Web service, a SOAP message flows between a client and a server based on the communication protocol, and various computer devices, built-in devices, and the like can receive information.

The use of the Web service allows exchanging SOAP messages containing not only texts but also large data such as an image. When a client transmits a large SOAP message to a server that provides a service for accepting a SOAP message, it takes time to end the transmission of the SOAP message. Hence, the need arises for a control mechanism of, when the client wants the server to receive an urgent SOAP message first during transmission of a large SOAP message, preferentially transmitting the urgent SOAP message.

As a technique of controlling priority between the client and the server, priority is controlled at the IP packet level by assigning a priority level to each IP packet flowing through the network. This priority control technique is implemented by interposing a relay device between the client and the server to interpret the priority level of an IP packet and transmit a packet having a high priority level (see, for example, patent literature 1).

CITATION LIST

Patent Literature

PLT1: US Pre-Grant Publication 2003/128708

SUMMARY OF INVENTION

Technical Problem

However, the conventional priority control technique requires a device dedicated to converting a priority level set by an application into that of an IP packet. Further, a relay device dedicated to controlling the priority level of an IP packet needs to be interposed between the client and the server.

The Web service is originally independent of the network layer and transport layer. However, when the priority control technique is used, the Web service needs to always be used in combination with a device which controls an IP packet. It becomes difficult to, for example, move a device, which performs processing at the SOAP message level, on a general-purpose servlet container capable of receiving a SOAP message from a network and processing it as a stream. This results in poor versatility of the device itself.

To preferentially transmit an urgent SOAP message first in processing independent of the network layer and transport layer, a less urgent SOAP message, which is being transmitted, has to be canceled once. To transmit the canceled SOAP message again, the transmission needs to start from the beginning. A longer time is taken to complete the transmission.

Although SOAP has been exemplified, this also applies to other messaging techniques such as XML-RPC (Remote Procedure Call) in addition to SOAP.

It is an object of the present invention to complete reception of a plurality of messages having priority levels within a short time in accordance with their priority levels.

Solution to Problem

A receiving device according to the present invention is characterized by comprising reception means for receiving a first message and a second message, detection means for detecting priority levels set in headers of the first message and second message, reading means for reading the first message and second message received by the reception means, and control means for, when the header of the second message is received during reading of the first message, controlling, in accordance with the priority levels of the first message and second message, reading rates at which the reading means reads the first message and the second message.

Advantageous Effects of Invention

According to the present invention, reception of a plurality of messages having priority levels can be completed within a short time in accordance with their priority levels.

Further features of the present invention will become apparent from the following description of exemplary embodiments with reference to the attached drawings. In the accompanying drawings, the same reference numerals denote the same or similar parts.

BRIEF DESCRIPTION OF DRAWINGS

The accompanying drawings, which are incorporated in and constitute a part of the specification, illustrate embodiments of the invention and, together with the description, serve to explain the principles of the invention.

DESCRIPTION OF EMBODIMENTS

A preferred embodiment of the present invention will be described in detail below with reference to the accompanying drawings. The following embodiment will exemplify a client server system as a communication system in which messages are transmitted and received between the transmitting side and the receiving side. A case in which the server provides a service corresponding to the message of a stream transmitted from an application in the client will be explained.

An outline of a priority control unit will be described. When a message higher in priority level than a message being received is transmitted between the client and the server, the priority control unit controls to receive the message having a higher priority level.

Figure 1:
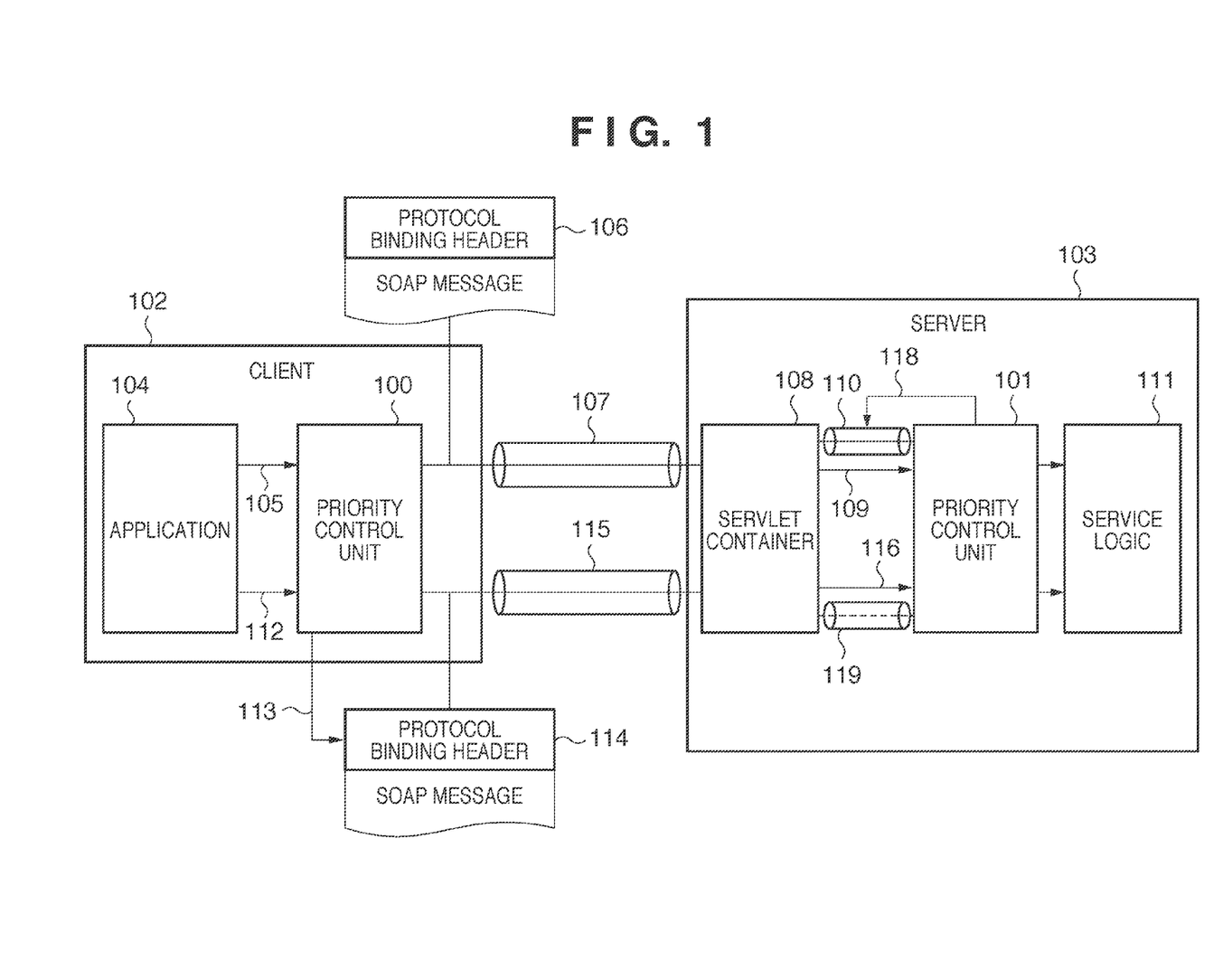
FIG. 1 is a block diagram showing the configuration of a client server system in an embodiment.

FIG. 1 is a block diagram showing the configuration of the client server system in the embodiment. In FIG. 1, priority control units 100 and 101 control reception of a SOAP message in accordance with a priority level set for the SOAP message. Reference numeral 102 denotes a client apparatus (client); and 103, a server apparatus (server). Although a SOAP message will be exemplified, a transmitted/received message may be an XML-RPC (Remote Procedure Call) message or the like other than the SOAP message. In XML-RPC, a message containing an HTTP header in the request header, and an XML document in the request body is transmitted/received.

The priority control units 100 and 101 have both the client and server functions, and may have the same functions. A device in which the priority control unit 100 or 101 is installed may be a multi-function peripheral having a plurality of functions such as copy, scan, and print functions, or a personal computer.

An application 104 is installed in the client 102 to access the Web service on the server side using the priority control unit 100. In accordance with an instruction 105 from the application 104, the priority control unit 100 generates a SOAP message 106 containing a corresponding protocol binding header, and transmits it to the server 103. The transmitted SOAP message 106 flows as a stream 107 through the network. A servlet container 108 in the server 103 starts receiving data from the start of the SOAP message. Note that the protocol binding header is a header containing information handled by a protocol (for example, HTTP) for transmitting a SOAP message.

Then, the priority control unit 101 of the server 103 acquires information 109 of the protocol binding header from the servlet container 108, and acquires the SOAP message as a stream 110. From the information 109 of the protocol binding header, the server 103 can determine, at the HTTP level serving as the application layer, that the received message is the SOAP message. After the end of acquiring the entire SOAP message, the priority control unit 101 binds the acquired SOAP message to service logic 111. Upon receiving the SOAP message, the service logic 111 executes processing of a service designated by the application 104.

Processing by the priority control units 100 and 101 to preferentially transmit an urgent SOAP message to the server without canceling transmission of a less urgent SOAP message by the client will be explained.

The application 104 of the client 102 instructs the priority control unit 100 to preferentially transmit an urgent SOAP message 114 to the server 103 during transmission of the SOAP message 106 (112). The priority control unit 100 extends the protocol binding header of the SOAP message 114 into an extension header capable of setting priority levels, and sets a high priority level indicating high urgency (113). The protocol binding header is, for example, an HTTP header. The HTTP header allows defining and transmitting an arbitrary header.

The HTTP specifications permit the user to set an arbitrary header and its value. On a side where a received HTTP header is analyzed, an unanalyzable header is ignored. Even if a message containing a unique header for a priority level or the like is transmitted and the receiving side cannot interpret it, the receiving side suffices to perform general message processing and can continue processing. To the contrary, if the priority level is set not in the protocol binding header but in, for example, a SOAP document serving as a message body, the receiving side may fail to analyze the SOAP document.

The information amount of the header is small. Thus, when the priority level is set in the header, the load of analysis processing on the receiving side becomes light. Processing of controlling the receiving rate of the SOAP document in the body, and priority processing can start quickly. An urgent message can therefore be received quickly.

The SOAP message 114 flows as a stream 115 through the network and is received by the servlet container 108 of the server 103. Then, the priority control unit 101 acquires information 116 of the protocol binding header of the SOAP message from the servlet container 108. The priority control unit 101 compares the priority level in the acquired protocol binding header with that of the SOAP message 106 during reception, and determines that the priority level of the SOAP message 114 is higher.

The priority control unit 101 calculates how much the reading rate of the SOAP message 106 having a lower priority level should be reduced to complete acquisition of the SOAP message 114 having a high priority level first. Based on the calculated result, the priority control unit 101 reduces the rate at which the SOAP message 106 during reception is read (118). The priority control unit 101 receives the SOAP message 114 as a stream 119. After the end of acquiring the entire SOAP message 114, the priority control unit 101 binds it to the service logic 111. In this manner, the urgent SOAP message 114 can be transmitted first to the server 103 without canceling transmission of the SOAP message 106.

Figure 2:
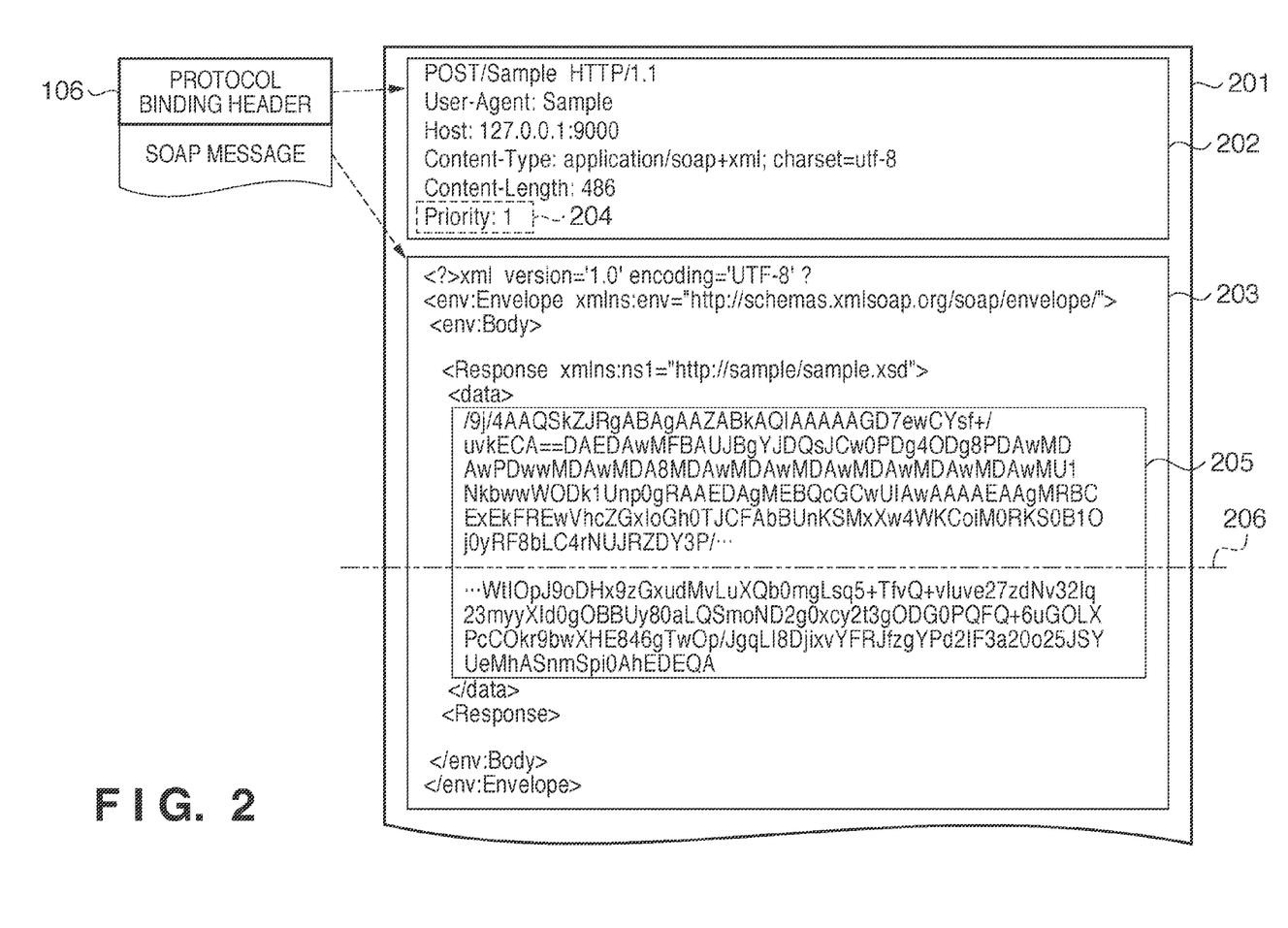
FIG. 2 is a view exemplifying a SOAP message containing a protocol binding header.

A SOAP message containing a protocol binding header will be described in detail with reference to FIG. 2. FIG. 2 is a view exemplifying a SOAP message containing a protocol binding header. An entire SOAP message 201 contains a protocol binding header, and is formed from a protocol binding header 202 and message body 203. In the embodiment, HTTP will be exemplified as a protocol.

The protocol binding header 202 has a header 202 containing information handled by a protocol (for example, HTTP) for transmitting a SOAP message. The protocol binding header 202 describes header information based on the HTTP specifications, such as Content-Type and Content-Length. A Priority header 204 is added as an extension header to the header 202 and indicates a priority level necessary for the above-described priority control. This description is possible because the HTTP header allows defining and transmitting an arbitrary header.

The priority control unit 101 of the server 103 determines a priority level based on the value in the extension header. In FIG. 2, a numerical value "Priority: 1" indicates a priority level, but the present invention is not limited to this description. That is, the present invention is also applicable to another specification agreed between the client and the server, other than a numerical value.

The SOAP message has a large size when, for example, binary data is embedded in the SOAP message, as shown in 205. In 205, binary data converted into the Base64 format is buried. In 205, intermediate information is omitted. If the binary data size is large, the SOAP message itself naturally has a large size and requires a long reading time. As described above, when the client 102 wants to transmit the urgent SOAP message 114 during transmission of the SOAP message 106, the server 103 may have read the SOAP message 106 up to only an intermediate portion 206. In the conventional technique, transmission of the SOAP message 106 has to be canceled once.

Figure 3:
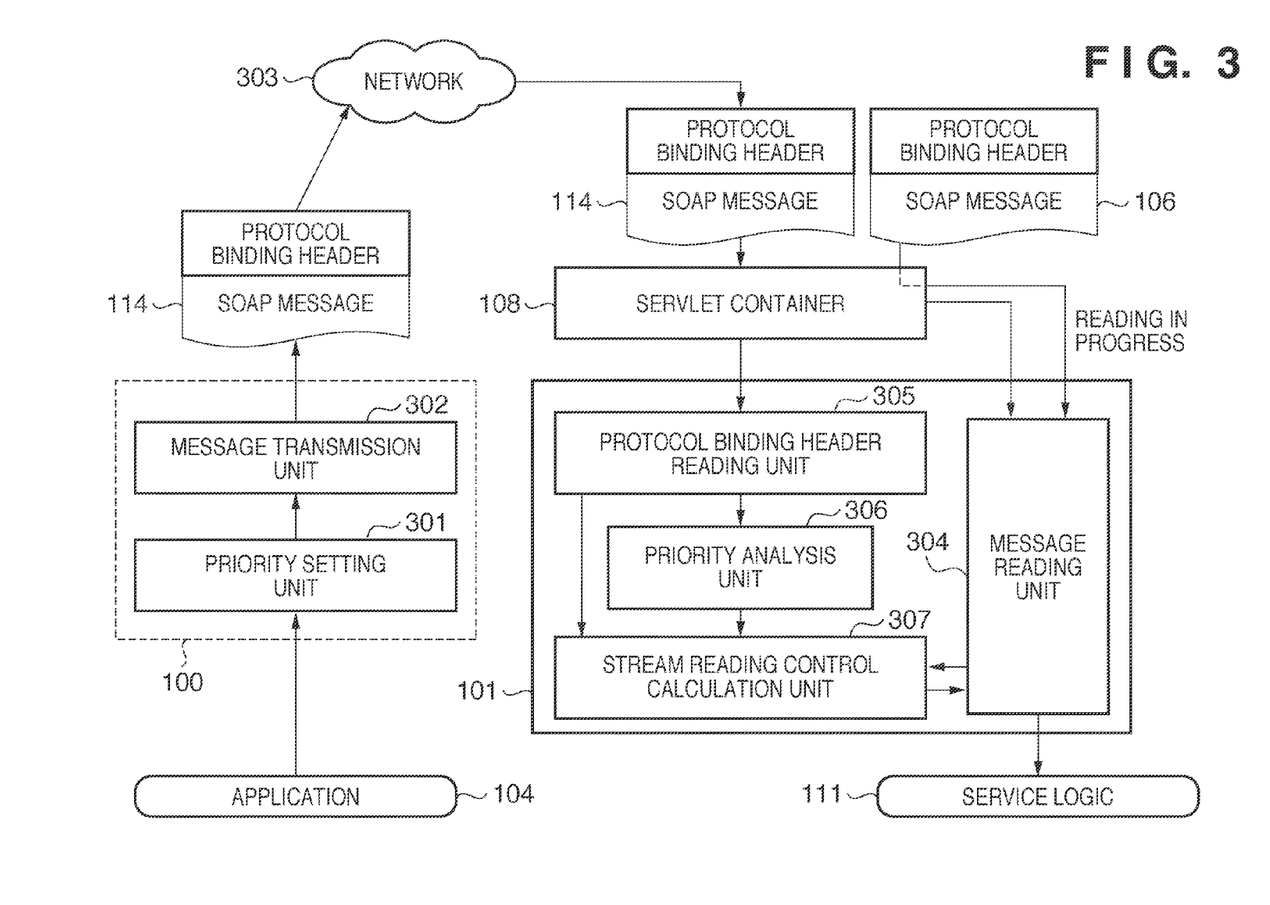
FIG. 3 is a block diagram exemplifying the arrangement of a priority control unit in the embodiment.

Concrete contents of the above-described processing by the priority control units 100 and 101 when transmitting the urgent SOAP message 114 without canceling transmission of the SOAP message 106 will be explained with reference to FIG. 3. FIG. 3 is a block diagram exemplifying the arrangement of the priority control unit in the embodiment. In FIG. 3, the same reference numerals as those in FIG. 1 denote the same parts, and a description thereof will not be repeated.

On the client side, the application 104 notifies a priority setting unit 301 of the priority control unit 100 of the priority level of a SOAP message it wants to transmit. The priority setting unit 301 sets the notified priority level as a value in the extension header of the protocol binding header. A SOAP message 114 containing, as an extension header, the protocol binding header in which the priority level is set is generated and transmitted to a network 303 from a message transmission unit 302.

On the server side, assume that a message reading unit 304 is reading, from the servlet container 108, the SOAP message 106 transmitted first from the client side. Although not shown in FIG. 3, the message transmission unit 302 is transmitting the SOAP message 106 in the state shown in FIG. 3. The servlet container 108 receives the SOAP message 114, and a protocol binding header reading unit 305 reads information of the protocol binding header of the SOAP message 114.

A priority analysis unit 306 acquires priority level information set in the extension header from the information of the protocol binding header, and compares it with priority level information of the SOAP message 106. As a result of the comparison, the priority analysis unit 306 determines to read the received SOAP message 114 preferentially to the SOAP message 106 being read. A stream reading control calculation unit 307 acquires information about the SOAP message 114 from the read header information. The information about the SOAP message 114 is, for example, the total size of the SOAP message 114.

The stream reading control calculation unit 307 receives the comparison result from the priority analysis unit 306, and acquires information about the SOAP message 106 being read from the message reading unit 304. The information about the SOAP message 106 is, for example, information indicating the size of an unread part of the SOAP message 106. The stream reading control calculation unit 307 analyzes how much the reading rate of the SOAP message 106 should be reduced to preferentially read the SOAP message 114. The stream reading control calculation unit 307 calculates control information.

The message reading unit 304 reduces the reading rate of the SOAP message 106 in accordance with the control information calculated by the stream reading control calculation unit 307. The message reading unit 304 reads the SOAP message 114 first from the servlet container 108. After the end of reading the SOAP message 114, the message reading unit 304 binds information of the SOAP message 114 to the service logic 111. After the end of reading the SOAP message 106 at the reduced reading rate, the message reading unit 304 binds the SOAP message 106 to the service logic 111, similar to the SOAP message 114.

Figure 4:
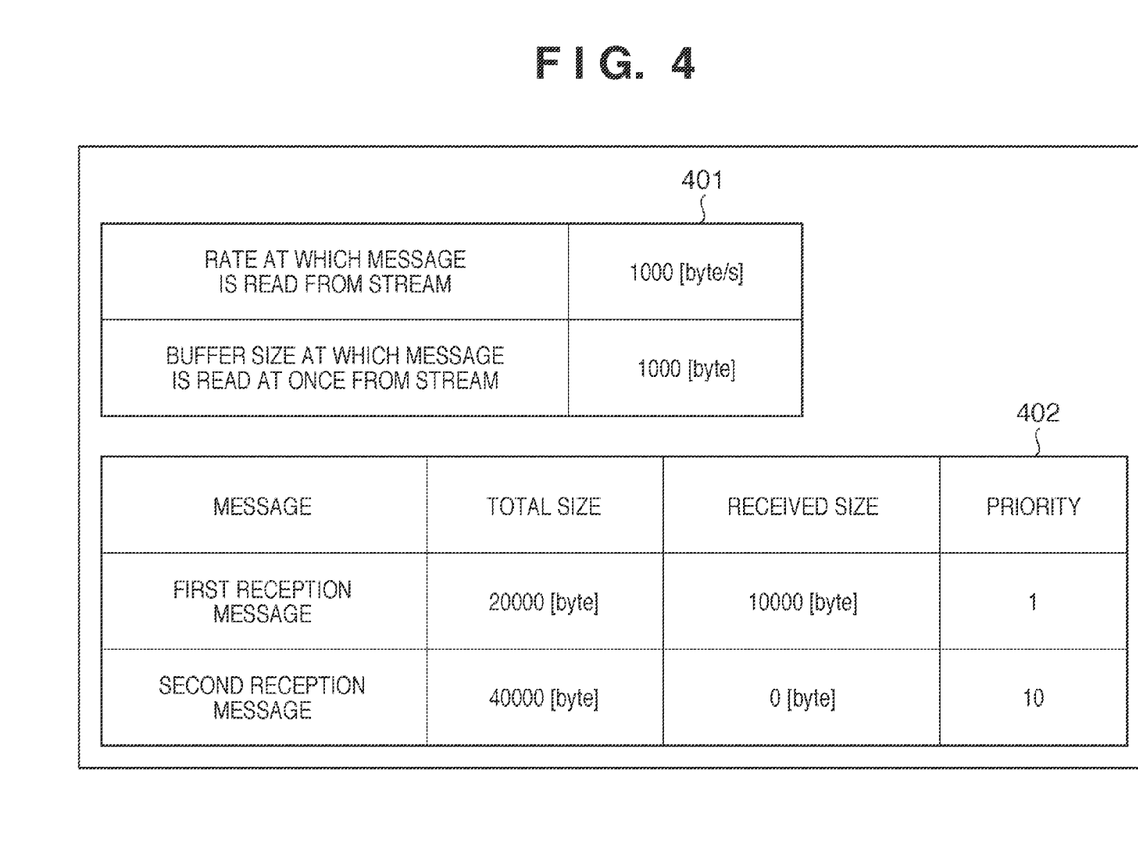
FIG. 4 is a table showing concrete numerical values at the start of priority control in the embodiment.
Figure 5:
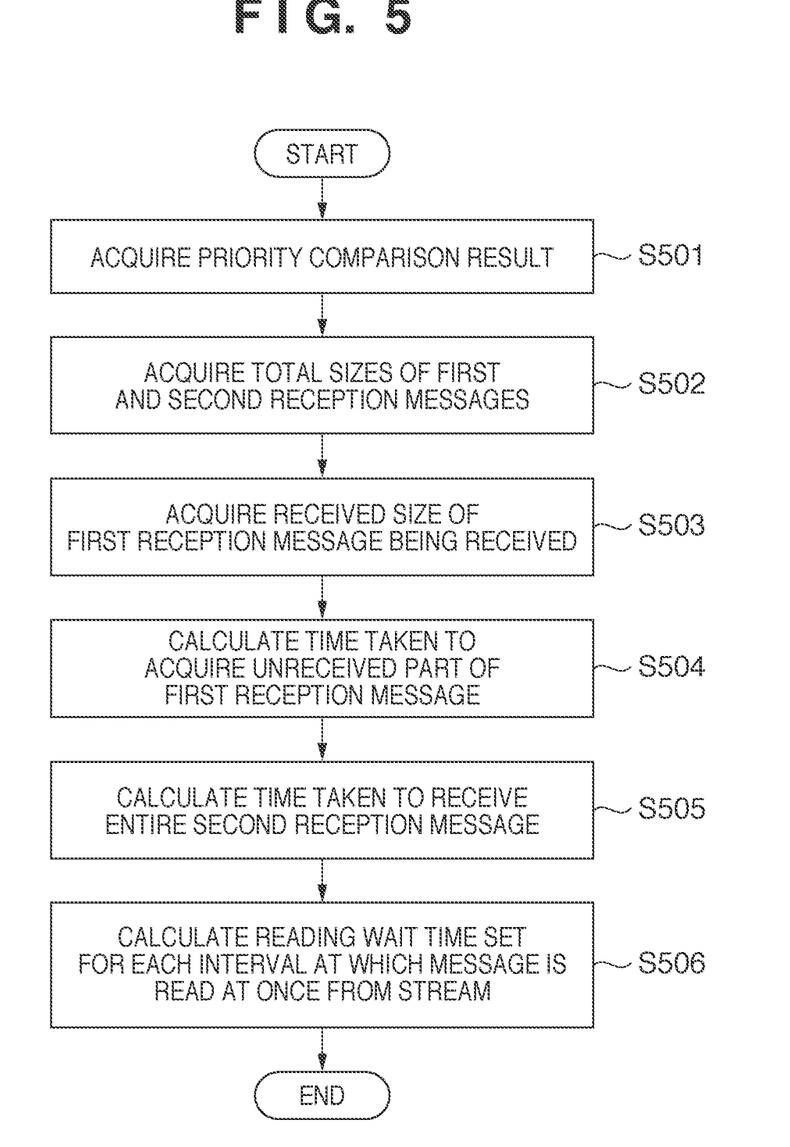
FIG. 5 is a flowchart showing processing by a stream reading control calculation unit.

Concrete contents of processing by the stream reading control calculation unit 307 in the priority control unit 101 of the server 103 will be explained with reference to FIGS. 4 and 5. FIG. 4 is a table showing concrete numerical values at the start of priority control in the embodiment. FIG. 5 is a flowchart showing processing by the stream reading control calculation unit.

In FIG. 4, reference numeral 401 denotes an example of numerical values indicating the processing capability of the server 103. In this example, 1000 [byte/s] is stored as the rate at which a message is read from a stream, and 1000 [byte] is stored as the buffer size at which a message is read at once from a stream. Reference numeral 402 denotes information of each message that holds the total size and received size of a message and the numerical value of the priority level. In 401, the rate at which a message is read from a stream is that at which the SOAP messages 106 and 114 are read. In 402, the first reception message is the SOAP message 106, and the second reception message is the SOAP message 114.

In step S501 shown in FIG. 5, the stream reading control calculation unit 307 acquires the result of analysis by the priority analysis unit 306. In the information 402 of each message, the numerical value of the priority level is "1" for the first reception message and "10" for the second reception message. The priority level of the second reception message is higher.

In step S502, the stream reading control calculation unit 307 acquires the total sizes (data amounts) of the first and second reception messages from information of the protocol binding header read by the protocol binding header reading unit 305. In the information 402 of each message, the total size is 20000 [byte] for the first reception message and 40000 [byte] for the second reception message. In step S503, stream reading control calculation unit 307 acquires the received size (data amount) indicating a size of that part of the first reception message being received, which has already been received. In the information 402 of each message, the received size of the first reception message is 10000 [byte].

In step S504, the stream reading control calculation unit 307 calculates the time taken to receive the remaining unreceived part of the first reception message. In this example, the remaining unreceived part (unreceived data amount) is calculated by subtracting the received size from the total size, that is, 20000−10000=10000 [byte]. The rate at which a message is read from a stream is set to 1000 [byte/s]. Thus, the time necessary to read the remaining unreceived part is 10 sec in accordance with the following equation:

10000 [byte]÷1000 [byte/s]=10 [s]

In step S505, the stream reading control calculation unit 307 calculates the time taken to receive the entire second reception message. In the information 402 of each message, the rate at which a message is read from a stream is set to 1000 [byte/s]. The time necessary to receive the entire second reception message is 40 sec in accordance with the following equation:

40000 [byte]÷1000 [byte/s]=40 [s]

In step S506, based on the priority comparison result and the calculation results, the stream reading control calculation unit 307 calculates a reading wait time set for each interval at which a message is read at once from a stream. For example, from the acquired priority comparison result, the stream reading control calculation unit 307 determines that the second reception message needs to be received preferentially to the first reception message. The stream reading control calculation unit 307 analyzes how much the reading rate of the first reception message should be reduced to complete reception of the second reception message before the first reception message.

More specifically, the stream reading control calculation unit 307 analyzes a reading wait time set for each interval at which a message is read at once from the stream of the first reception message. In this example, the buffer size at which a message is read at once from a stream is 1000 [byte]. To read the 10000 [byte]-unreceived part of the first reception message, processing needs to loop 10 times in accordance with the following equation:

10000 [byte]÷1000 [byte]=10 [time]

These results will be summarized. The time taken to read the unreceived part of the first reception message is 10 sec, the number of times by which processing loops for reading is 10, and the time taken to complete reception of the second reception message is 40 sec. From these results, the reading wait time (waittime) as a final calculated value is 3 sec in accordance with the following equation:

10 [s]+waittime×10 [time]>40 [s] waittime>3 [s]

Hence, by setting a reading wait time (waittime) longer than 3 sec for each loop, reading of the second reception message can end prior to reading of the unreceived part of the first reception message.

In the embodiment, the reading rate of the first message is decreased by prolonging, by the reading wait time, the interval at which the first message is read from a stream. However, the present invention is not limited to this. For example, the reading rate of the first message may be decreased by reducing the reading amount (byte count) by which the first message is read at once from a stream. Even by this method, the second message can be preferentially received, similar to the foregoing method.

According to the embodiment, priority control is done on the application layer in HTTP or the like. The versatility of the device itself can be enhanced independently of the network layer and transport layer. The receiving side can preferentially receive the second message having high urgency without canceling transmission of the first message on the transmitting side.

Figure 6:
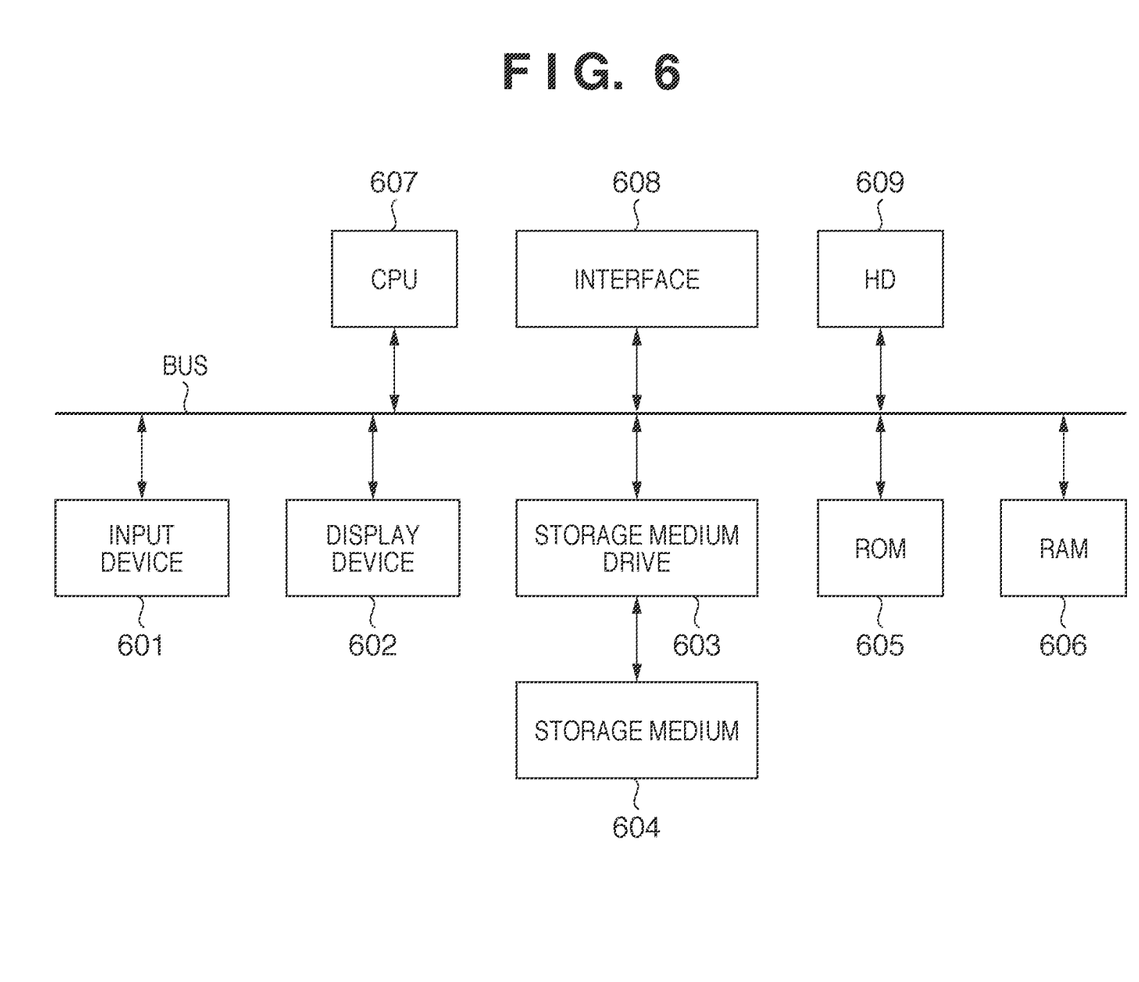
FIG. 6 is a block diagram exemplifying the arrangement of an information processing apparatus functioning as a client or server.

Information processing apparatuses (computers) are available as the client 102 and server 103 in the embodiment. FIG. 6 is a block diagram exemplifying the arrangement of an information processing apparatus functioning as a client or server. FIG. 6 exemplifies the hardware configuration of the information processing apparatus which executes software for implementing the functions of the above-described embodiment.

The information processing apparatus includes, as hardware components, an input device 601, display device 602, storage medium drive 603, ROM 605, RAM 606, CPU or MPU 607, interface 608, and HD (Hard Disk) 609. The input device 601 is formed from a keyboard, mouse, and the like manipulated by the user (operator) of the information processing apparatus. The input device 601 is used to input various kinds of manipulation information to the information processing apparatus. The display device 602 is formed from a display or the like used by the user of the information processing apparatus. The display device 602 is used to display various kinds of information (or screens) and the like.

The interface 608 connects the information processing apparatus to a network or the like. A program regarding the above-mentioned processing and the like is provided to the information processing apparatus via a storage medium 604 such as a CD-ROM, or downloaded via a network or the like. The storage medium 604 is set in the storage medium drive 603, and the program is installed in the HD 609 from the storage medium 604 via the storage medium drive 603.

The ROM 605 stores, for example, a program which is loaded first upon turning on the information processing apparatus. The RAM 606 is the main memory of the information processing apparatus. The CPU 607 reads out the program from the HD 609, stores it in the RAM 606, and executes it, thereby achieving the above-described processing contents. In addition to the program, the HD 609 stores a Web service flow description document, Web service interface description document, and the like.

The present invention can also be achieved by executing the following processing. More specifically, software (program) for implementing the functions of the above-described embodiment is supplied to a system or apparatus via a network or various types of storage media. The computer (for example, a CPU or MPU) of the system or apparatus reads out and executes the program.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-198624, filed Jul. 31, 2008, which is hereby incorporated by reference herein in its entirety.

The invention claimed is:

1. A receiving device comprising:
a reception unit configured to receive a message;
a reading unit configured to read the message received by the reception unit;
an acquisition unit configured to acquire, in a case where a second message with a higher priority level than a first message is transmitted during receiving the first message, a size of the whole second message and a size of an unreceived part of the first message;
a calculation unit configured to calculate a first time length for receiving the unreceived part of the first message based on the size of the unreceived part of the first message and calculate a second time length for receiving the second message based on the size of the whole second message; and
a control unit configured to control a reading rate of the first message by the reading unit to decrease so that reading of the second message is completed before completion of reading of the first message while continuing to read the first message, based on the first time length and the second time length.

2. The receiving device according to claim 1, wherein the control unit controls, in accordance with priority levels of the first message and the second message and the size of the whole second message, the reading rate where the reading unit reads the first message.

3. The receiving device according to claim 1, wherein the calculation unit calculates an end time when reading of the second message ends, and the control unit controls the reading rate of the first message to end reading of the first message after the end time.

4. The receiving device according to claim 1, wherein the control unit controls, in accordance with priority levels of the first message and the second message, reading intervals at which the reading unit reads the first message.

5. The receiving device according to claim 1, wherein the control unit controls, in accordance with priority levels of the first message and the second message, an amount of readings into which the reading unit reads the first message at once.

6. The receiving device according to claim 1, wherein the priority level is set in a protocol binding header handled by a protocol for transmitting a message.

7. A receiving method for a receiving device, comprising:
a reception step of receiving a message;
a reading step of reading the message received in the reception step;
an acquisition step of acquiring, in a case where a second message with a higher priority level than a first message is transmitted during receiving the first message, a size of the whole second message and a size of an unreceived part of the first message;
a calculation step of calculating a first time length for receiving the unreceived part of the first message based on the size of the unreceived part of the first message and calculating a second time length for receiving the second message based on the size of the whole second message; and
a control step of controlling a reading rate of reading the first message to decrease so that reading of the second message is completed before completion of reading of the first message while continuing to read the first message, based on the first time length and the second time length.

8. The receiving method for a receiving device according to claim 7, wherein in the control step, the reading rate at which the first message is read in the reading step is controlled in accordance with priority levels of the first message and the second message and a size of the whole second message.

9. The receiving method for a receiving device according to claim 7, wherein in the calculation step, an end time when reading of the second message ends is calculated, and in the control step, the reading rate of the first message is controlled to end reading of the first message after the end time.

10. The receiving method for a receiving device according to claim 7, wherein in the control step, reading intervals at which the first message read in the reading step are controlled in accordance with priority levels of the first message and the second message.

11. The receiving method for a receiving device according to claim 7, wherein in the control step, an amount of readings into which the reading step reads the first message at once are controlled in accordance with priority levels of the first message and the second message.

12. The receiving method for a receiving device according to claim 7, wherein the priority level is set in a protocol binding header handled by a protocol for transmitting a message.

13. A non-transitory computer-readable storage medium storing a computer-executable code of a computer program for causing a computer to execute a receiving method for a receiving device, the code, when executed, causing the computer to perform steps comprising:
a reception step of receiving a message;
a reading step of reading the message received in the reception step;
an acquisition step of acquiring, in a case where a second message with a higher priority level than a first message is transmitted during receiving the first message, a size of the whole second message and a size of an unreceived part of the first message;
a calculation step of calculating a first time length for receiving the unreceived part of the first message based on the size of the unreceived part of the first message and calculating a second time length for receiving the second message based on the size of the whole second message; and
a control step of controlling a reading rate of the first message to decrease so that reading of the second message is completed before completion of reading of the first message while continuing to read the first message, based on the first time length and the second time length.

14. The non-transitory computer-readable storage medium according to claim 13, wherein in the control step, the reading rate at which the first message is read in the reading step is controlled in accordance with priority levels of the first message and the second message and a size of the second message.

15. The non-transitory computer-readable storage medium according to claim 13, wherein in the calculation step, an end time when reading of the second message ends is calculated, and in the control step, the reading rate of the first message is controlled to end reading of the first message after the end time.

16. The non-transitory computer-readable storage medium according to claim 13, wherein in the control step, reading intervals at which the first message is read in the reading step are controlled in accordance with priority levels of the first message and the second message.

17. The non-transitory computer-readable storage medium according to claim 13, wherein in the control step, an amount of readings into which the first message is read in the reading step at once are controlled in accordance with priority levels of the first message and the second message.

18. The non-transitory computer-readable storage medium according to claim 13, wherein the priority level is set in a protocol binding header handled by a protocol for transmitting a message.

19. The receiving device according to claim 1, wherein the control unit controls the reading rate of the first message to decrease so as to preferentially read the second message while continuing the reading of the first message.

* * * * *